US007233461B2

(12) United States Patent
Gill

(10) Patent No.: US 7,233,461 B2
(45) Date of Patent: Jun. 19, 2007

(54) STABILIZATION STRUCTURE FOR CPP GMR/TV

(75) Inventor: Hardayal Singh Gill, Palo Alto, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 486 days.

(21) Appl. No.: 10/761,698

(22) Filed: Jan. 20, 2004

(65) Prior Publication Data
US 2005/0157436 A1    Jul. 21, 2005

(51) Int. Cl.
*G11B 5/33* (2006.01)

(52) U.S. Cl. .................................. 360/324.12

(58) Field of Classification Search ........... 360/324.12, 360/324.1, 324.11, 324.2, 314
See application file for complete search history.

(56) References Cited

U.S. PATENT DOCUMENTS

| | | | |
|---|---|---|---|
| 6,275,363 B1 * | 8/2001 | Gill ........................ | 360/324.2 |
| 6,313,973 B1 | 11/2001 | Fuke ....................... | 360/324.1 |
| 6,490,140 B1 | 12/2002 | Mao et al. ............... | 360/324.11 |
| 6,574,079 B2 | 6/2003 | Sun et al. ................ | 360/324.2 |
| 6,741,432 B2 * | 5/2004 | Pinarbasi ................ | 360/324.11 |
| 6,795,280 B1 * | 9/2004 | Song et al. .............. | 360/324.2 |
| 6,822,838 B2 * | 11/2004 | Lin et al. ................. | 360/324.2 |
| 6,856,493 B2 * | 2/2005 | Pinarbasi ................ | 360/324.11 |
| 6,865,062 B2 * | 3/2005 | Pinarbasi ................ | 360/324.11 |
| 7,038,889 B2 * | 5/2006 | Freitag et al. ........... | 360/314 |
| 7,068,479 B2 * | 6/2006 | Sato et al. ............... | 360/324.12 |
| 7,072,154 B2 * | 7/2006 | Gill et al. ................ | 360/324.12 |
| 2002/0044398 A1 | 4/2002 | Sasaki et al. ........... | 360/324.12 |
| 2002/0055016 A1 | 5/2002 | Hiramoto et al. ....... | 428/692 |
| 2003/0030945 A1 * | 2/2003 | Heinonen et al. ....... | 360/324.2 |
| 2003/0049389 A1 | 3/2003 | Tsunekawa et al. ..... | 427/569 |
| 2003/0053270 A1 * | 3/2003 | Gill ........................ | 360/324.11 |
| 2003/0161077 A1 | 8/2003 | Kawawake et al. ..... | 360/324.1 |
| 2003/0184919 A1 * | 10/2003 | Lin et al. ................. | 360/314 |
| 2004/0080875 A1 * | 4/2004 | Pinarbasi ................ | 360/324.2 |

* cited by examiner

*Primary Examiner*—Tianjie Chen
(74) *Attorney, Agent, or Firm*—Larry B. Guernsey; Intellectual Property Law Offices

(57) ABSTRACT

A magnetic head has a read sensor which includes at least one primary pinned layer, a barrier layer, and a free layer. An in-stack biasing structure having net magnetic moment near zero, notated as dM=0, is constructed above the free layer. This in-stack biasing structure acts to stabilize the free layer by exchange coupling.

14 Claims, 4 Drawing Sheets

STABILIZATION STRUCTURE FOR CPP GMR/TV

BACKGROUND OF THE INVENTION

1. Field of the Invention

The present invention relates generally to read heads for magnetic data storage mediums, and more particularly to a read head using exchange coupling to stabilize the free magnetic layer of the read head.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads has become progressively smaller. This decrease in track width has allowed for dramatic increases in the recording density and data storage of disks.

Recent read heads typically use a tunnel junction sensor, also known as a "tunnel valve", abbreviated "TV", for reading the magnetic field signals from the rotating magnetic data storage disk. The sensor typically includes a nonmagnetic tunneling barrier layer sandwiched between a ferromagnetic pinned layer and a ferromagnetic free layer. The pinned layer in turn is fabricated on an antiferromagnetic (AFM) pinning layer which fixes the magnetic moment of the pinned layer at an angle of 90 degrees to the air bearing surface (ABS). The tunnel junction sensor is itself typically sandwiched between ferromagnetic first and second shield layers. These first and second shield layers also serve as first and second electrical lead layers, and are connected to the tunnel junction sensor for conducting a tunneling current through it. The tunneling current is preferably configured to conduct Current Perpendicular to the Planes (CPP) of the film layers of the sensor, as opposed to a sensor where a sense Current In the Planes (CIP) or parallel to film layers of the spin valve sensor. The CPP configuration is attracting more attention lately, as it can be made to be more sensitive than the CIP configuration, and thus is more useful in higher densities of tracks and data.

The magnetic moment of the free layer is free to rotate upwardly and downwardly with respect to the ABS from a quiescent or zero bias point position in response to positive and negative magnetic field signals from the rotating magnetic disk. The sensitivity of the tunnel junction sensor is quantified as magnetoresistive coefficient dr/R where dr is the change in resistance of the tunnel junction sensor from minimum resistance to maximum resistance and R is the resistance of the tunnel junction sensor at minimum resistance.

The free layer material is very soft material, magnetically speaking, with very low coercivity, which is a measure of the minimum field strength necessary to make changes in the orientation of the magnetic domains. The free layer material necessarily must have this quality, as it is this layer's changes in magnetic alignment in response to the magnetic domains in the data disk that leads to changes in resistance, which is how the data is read. This material may therefore very easily fall into a multidomain state, where alignment of magnetic domains is not uniform, or in other words, to become demagnetized. It is desirable however that the magnetization of the free layer be biased to be uniform throughout the entire layer. When the tunneling current is conducted through the sensor without magnetic field signals from the rotating magnetic disk, this is known as the quiescent position of the magnetic moment of the free layer. The preferred biased direction is parallel to the ABS.

If the free layer material is allowed to assume a multidomain state, the read signal will be degraded. In order to maintain the biased alignment during the quiescent state to produce better signal quality, there must be some external field applied to the free layer. The application of this external field is known as "stabilization".

It is possible to stabilize the free layer by applying a layer of anti-ferromagnetic (AFM) material, but this method can have disadvantages that result from the thickness of the AFM material, which is typically large, and the strength of the biasing field produced, which must be large enough to stabilize the free layer material without pinning it too strongly. There may also be improvements in performance if the net magnetic moment of the layer providing exchange coupling to the free layer is kept near zero, as the magnetic system will be more stable. Once the magnetic moment is near zero, the material does not have shape demagnetizing and therefore retains pinning and stability to very narrow track widths and also does not demagnetize at elevated temperatures.

Thus there is a need for a stabilizing layer or layers which produces a proper biasing field, which is thin and does not contribute greatly to the overall head thickness and which preferably has a net magnetic moment very near zero.

SUMMARY OF THE INVENTION

A preferred embodiment of the present invention is a magnetic head having a read sensor which includes at least one primary pinned layer, a barrier layer, and a free layer. An in-stack biasing structure having net magnetic moment near zero, notated as dM=0 (which is modeled by dT<5 Å, using a quantity of "magnetic thickness, dT" as a measure), is constructed above the free layer. This in-stack biasing structure acts to stabilize the free layer by exchange coupling.

Also disclosed is a disk drive having this magnetic head and method for fabrication of the magnetic head.

It is an advantage of the present invention that the overall thickness dimension of the read sensor is reduced, allowing the head to be made smaller.

It is another advantage of the present invention that as the net magnetic moment of the layer providing exchange coupling to the free layer is kept near zero, the magnetic system is more stable. Once the magnetic moment is near zero, the material does not have shape demagnetizing and therefore retains pinning and stability to very narrow track widths and also does not demagnetize at elevated temperatures.

It is a further advantage of the present invention that by using layers for which dM=0, pinning is made independent of the sensor geometry such as stripe height and read width.

It is an additional advantage of the present invention that stronger biasing may be obtained using paired layers for which dM=0, compared to using AFM, as exchange coupling from AFM is inversely proportional to dM.

It is yet another advantage of the present invention that using paired layers for which dM=0 also extends the superparamagnetic limit by allowing both layers to be scaled together to increase the total volume of the bias layer without changing the bias itself.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
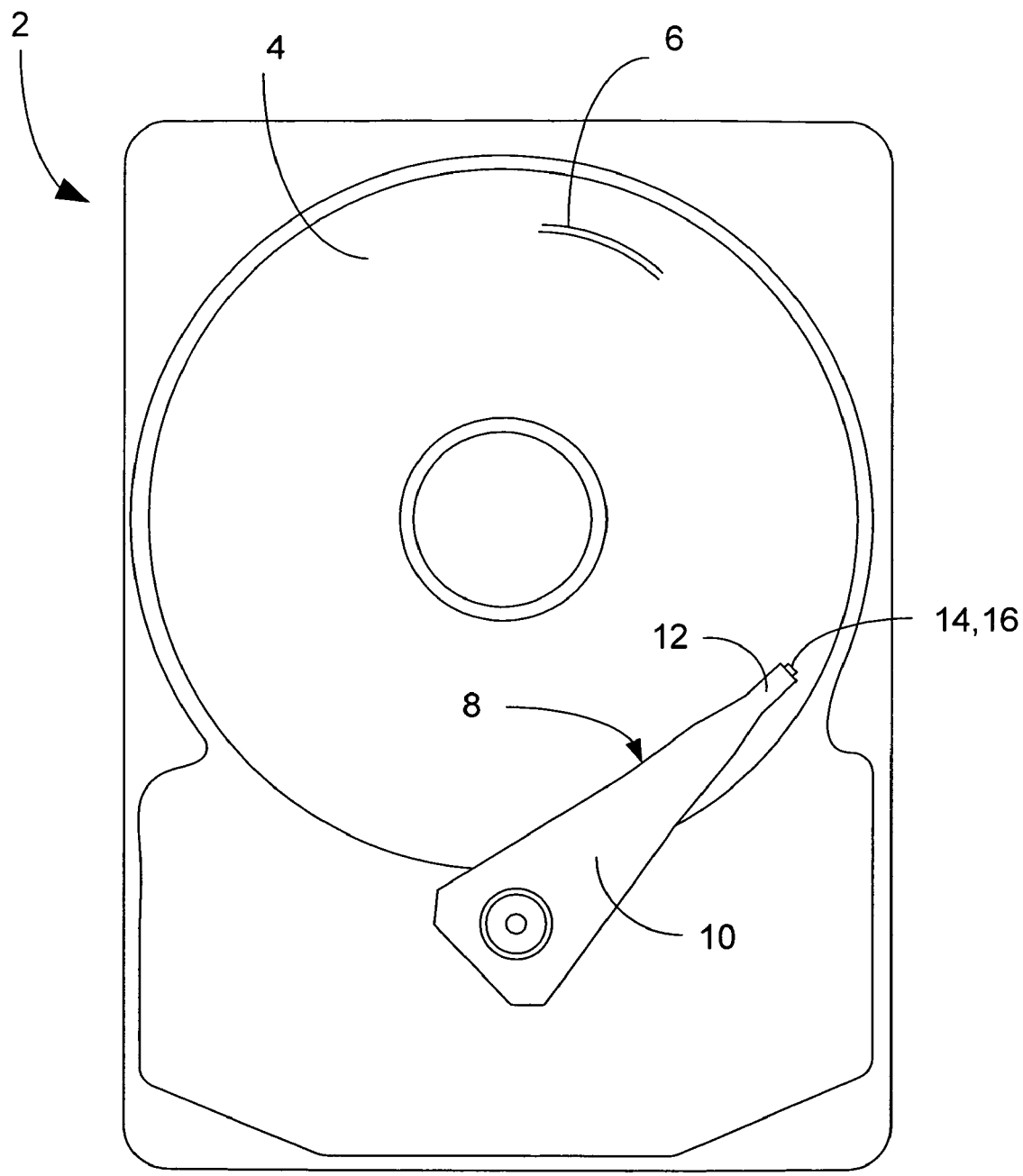
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
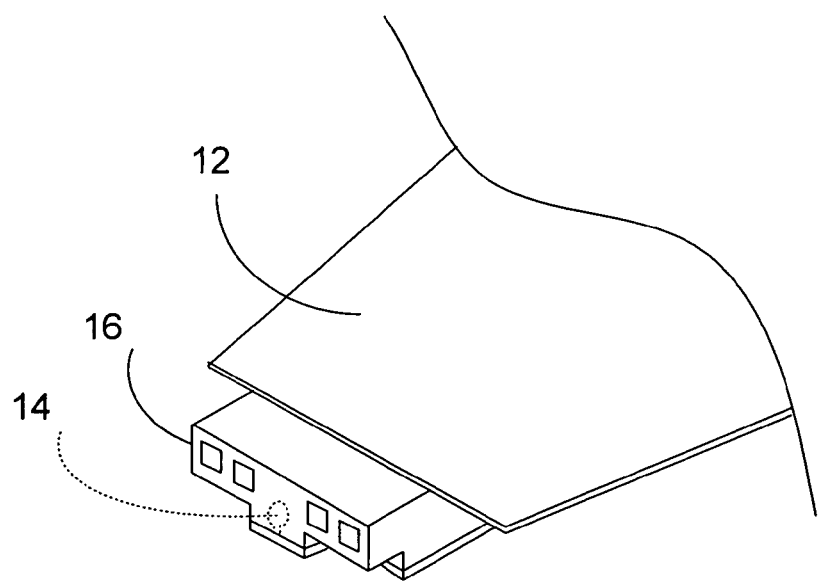
FIG. 2 illustrates a perspective view of view of an exemplary slider and suspension.
Figure 3:
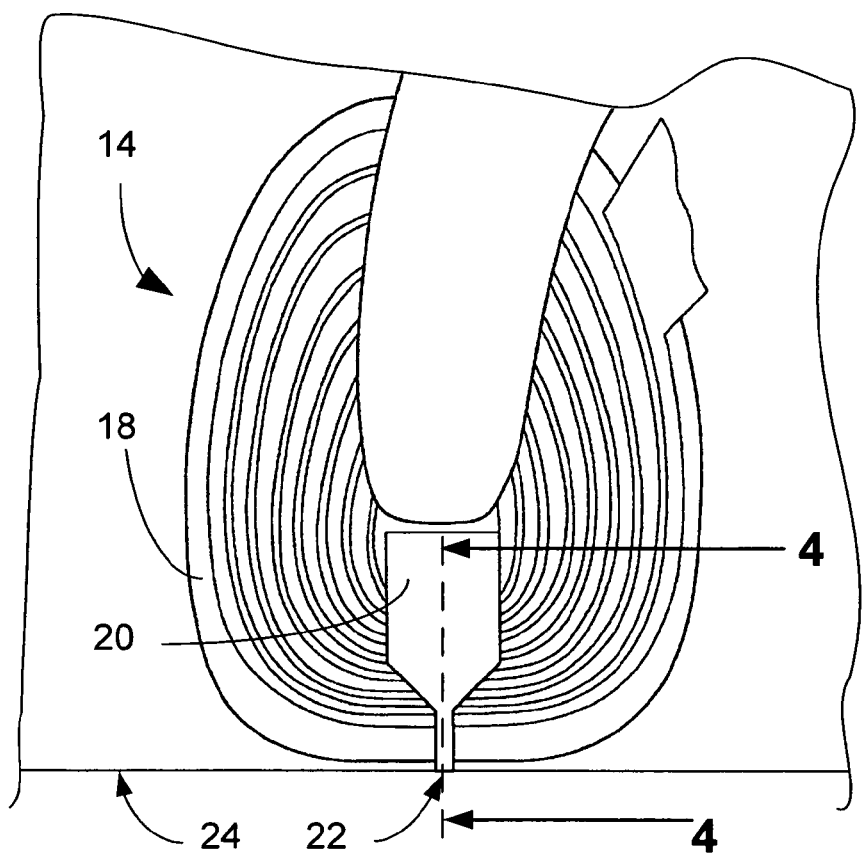
FIG. 3 shows a top plan view of an exemplary read/write head.
Figure 4:
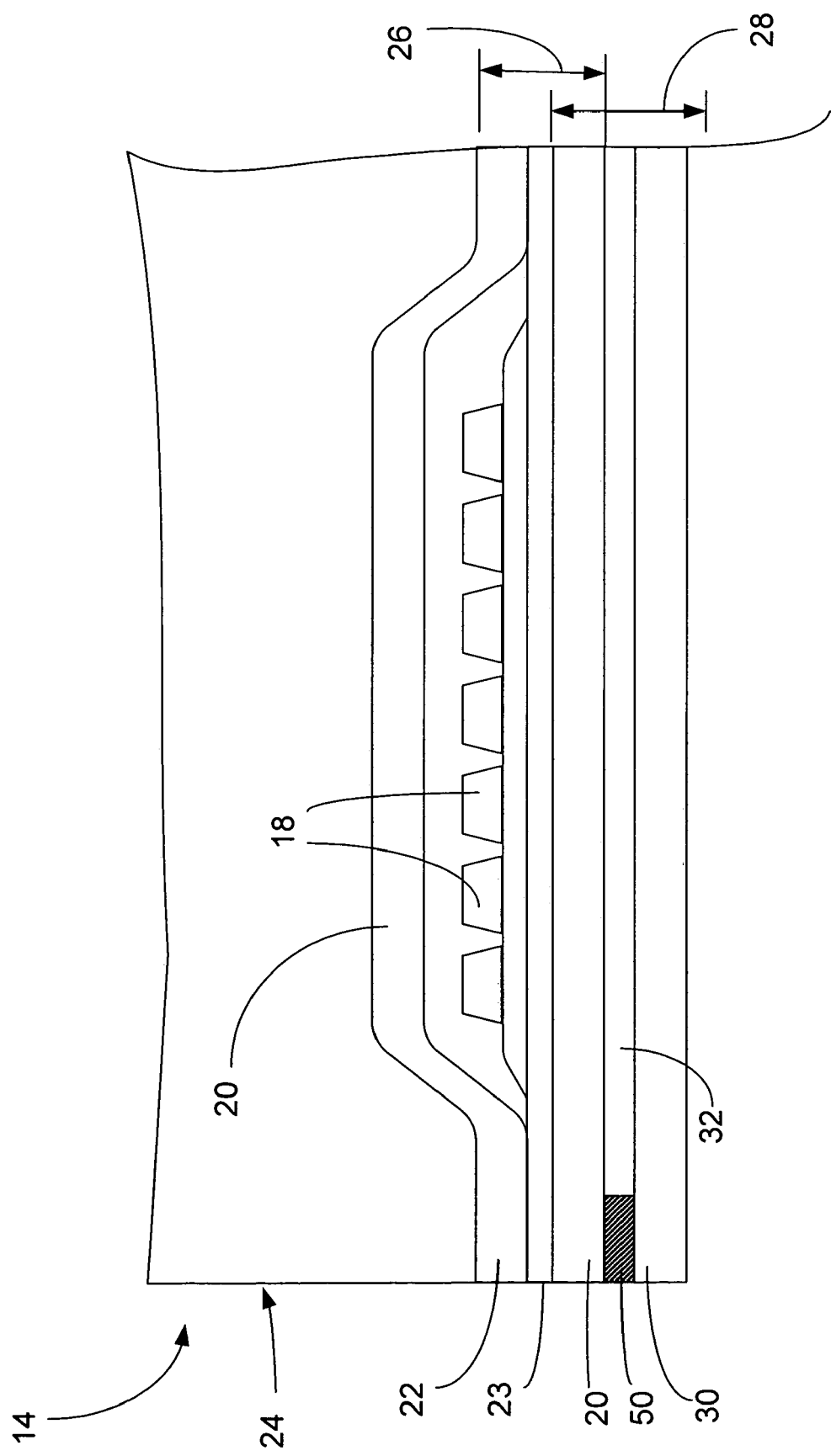
FIG. 4 is a cross-section view of an exemplary read/write head as taken through plane 4—4 of FIG. 3.

FIG. 2 shows a slider 16 in more detail being supported by suspension 12. The magnetic head 14 is shown in dashed lines, and in more detail in FIGS. 3 and 4. The magnetic head 14 includes a coil 18 and P1 pole, which also acts as S2 shield, thus making P1/S2 20. The second pole P2 22 is separated from P1/S2 by write gap 23. In this configuration of read head, where Current is Perpendicular to the Plane (CPP), Shield S1 30 and P1/S2 20 act as electrodes supplying current to the read sensor 50 which lies between them. An insulation layer 32 also separates the S1 30 and P1/S2 20 electrodes in the area behind the read sensor 50, so that they do not short out along their length.

The magnetic head 14 flies on an air cushion between the surface of the disk 4 and the air bearing surface (ABS) 24 of the slider 16. The write head portion 26 and the read head portion 28 are generally shown, with the read head sensor 50 and the ABS 24.

Figure 5:
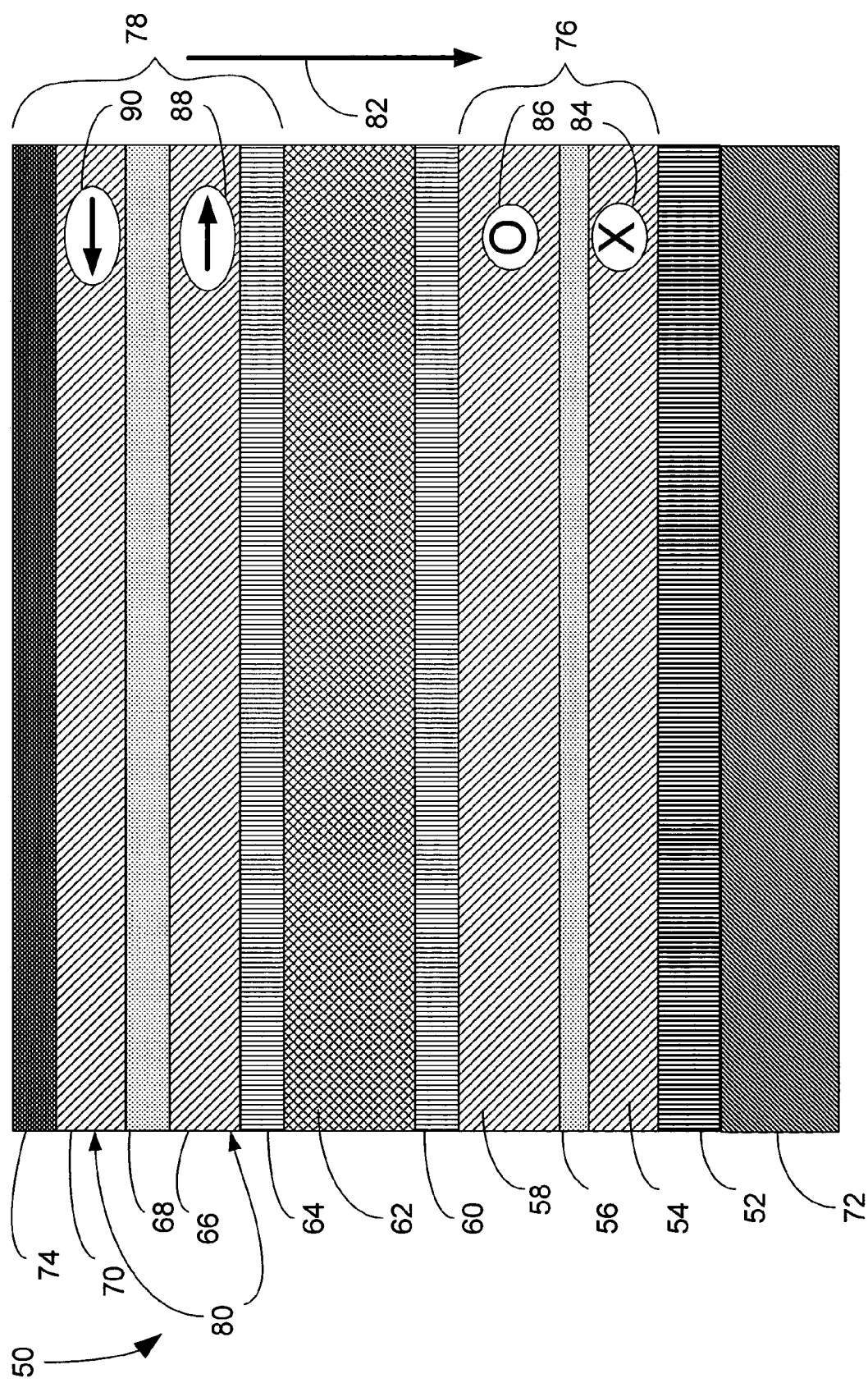
FIG. 5 is a detail front plan view of the read sensor of the present invention as seen from the Air Bearing Surface.

The present invention includes a read head sensor 50 which is constructed as shown in FIG. 5, which is a front plan view as seen from the Air Bearing Surface (ABS). A seed layer 52 lies on top of a layer of Anti-Ferromagnetic (MM) material 72, and beneath a first pinned layer 54, preferably fabricated from CoFe. A separation layer 56 preferably of Ru separates the first pinned layer 54 from a second pinned layer 58. Next a barrier layer 60 preferably of Cu is fabricated upon the second pinned layer 58, and the free layer 62, which is made of magnetically soft ferromagnetic material is deposited upon the barrier layer 60. On top of the free layer 62 is the in-stack biasing structure 78 which includes a spacer layer 64, again preferably comprised of Cu, followed by a first paired layer 66 and a second paired layer 70, both preferably comprised of CoFe, which are separated by a layer of Ru 68. The structure is topped by a layer of Ta 74.

The first and second pinned layers 54, 58 and the sandwiched Ru layer 56 together will be referred to as the primary pinned layer 76, which is in an anti-parallel configuration. The direction of the magnetic field flux in the first pinned layer 54 is preferably into the plane of the paper, as shown by the directional arrow 84, represented in this case by the circled "X". The direction of the magnetic field flux in the second pinned layer 58 is preferably out of the plane of the paper as shown by the directional arrow 86, represented in this case by the circled "O". The current direction is perpendicular to the planes (CPP) of the layers, as shown by the arrow 82.

The directions of the magnetic field flux in the first paired layer 66 and a second paired layer 70 of the in-stack biasing structure 78 are opposite to each other, but lie in the plane of the paper, as shown by the two directional arrows 88, 90, and thus are parallel to the ABS. The thicknesses of the layers and the field strengths of the first paired layer 66 and a second paired layer 70 are preferably very close to each other, so that the two fields end up canceling each other out, as far as their external influence on the other layers is concerned. This cancellation is referred to as having a net magnetic moment near zero, notated as dM=0 (which is modeled by dT<5 Å, using a quantity of "magnetic thickness, dT" as a measure, discussed below). "dM=0", means that the differential in field strengths is zero between the two layers and the net result is very near zero field strength. The first paired layer 66 and a second paired layer 70 together thus will be referred to as the dM=0 layers 80. There are several advantages to this configuration, as will be discussed below.

For the purposes of this application, the term "dM=0" shall be used to indicate that the net magnetic moment is very near zero, or substantially zero, although it is to be understood that it is very difficult to make the net magnetic moment exactly equal to zero. As a way of understanding the limitations of this term, it may be useful to discuss the difference in "magnetic thickness" or "dT" of these layers. For material with a certain value of magnetization M, having units of emu/cm$^3$ and of thickness of material t, having units of cm, $$\text{magnetic thickness } T = M \times t$$

thus having units of emu/cm$^2$. For 2 layers of material having the same magnetism M value, the difference in magnetic thickness dT will correspond to the difference in thickness of the layers. Thus, to achieve a dM very near zero, dT is preferred to be less than 5 Å (less than 5×10$^{-10}$ meters). For ease of reference, the term dM=0 will be used in this discussion, with the understanding that it refers back to dT<5 Å. As an example, the first paired layer 66 may have a thickness of 13 Å and the second paired layer 70 may have a thickness of 15 Å, so that the differential in thickness is 2 Å. If both layers are of the same material with the same magnetic properties, then the net magnetic moment can be modeled by the difference in the layers thicknesses, i.e. 2 Å, which is thus <5 Å, and thus the net magnetic moment is very near zero.

The free layer material 62 is very soft material, magnetically speaking, with very low coercivity, which is a measure of the minimum field strength necessary to make changes in the orientation of the magnetic domains. It is necessary that the free layer be able to change direction in response to the change in direction of the magnetic data fields that it is reading from the data medium. It is this change in the orientation of the free layer domains that results in a changing resistance of the read head. This changed resistance in turn is sensed as a change in sensor current, and circuitry senses and interprets this, and thus ultimately allows the data to be read as ones and zeros.

It is important that the free layer be able to respond to changes of the magnetic data bits that it reads, and it is also important that the free layer not be allowed to assume a multi-domain state, when not actively responding to the data domains. As discussed above, this material is very magnetically soft and may therefore very easily fall into a multidomain state, where alignment of magnetic domains is not uniform. If the free layer material is allowed to assume a multidomain state, the read signal will be degraded. In order to maintain the alignment during the quiescent state to produce better signal quality, there must be some external bias applied to the free layer. The application of this bias is known as "stabilization".

It is desirable that the magnetization of the free layer be biased to be uniform throughout the entire layer. When the tunneling current is conducted through the sensor without magnetic field signals from the rotating magnetic disk, this is known as the quiescent state of the magnetic moment of the free layer. The preferred biased direction of the free magnetic layer 62 is parallel to the ABS.

This biasing has previously been done by application of an external magnetic field which is strong enough to align the domains when in the quiescent state, but not strong enough to interfere with the free movement of the domains in the free layer in response to the sensed data bit domains.

In the present invention 50, the dM=0 layers 80 produce substantially no external magnetic field, but instead rely on exchange coupling to bias the free layer 62, and thus stabilize it. Exchange coupling between two ferromagnetic layers across a non-magnetic spacer is a well known phenomena in magnetism. It is a quantum mechanical phenomenon where electron wave functions in two neighboring materials overlap to provide exchange coupling in spite of the fact that a nonmagnetic spacer separates these materials.

The net magnetic moment of the layer providing exchange coupling to the free layer is kept near zero, dM=0 to make a more stable magnetic system. Once the magnetic moment is near zero, the material does not have shape demagnetizing and therefore retains pinning and stability to very narrow track widths and also does not demagnetize at elevated temperatures.

There are several other advantages to using the dM=0 layers 80 to stabilize the free layer 62. By using dM=0 layers 80, pinning is made independent of the sensor geometry such as stripe height and read width. Also stronger pinning may be obtained due to dM=0 layers 80 compared to using AFM, as exchange coupling from AFM is inversely proportional to dM. Using dM=0 layers also pushes the superparamagnetic limit out (this is limit where thermal effects cause magnetic material to become unpinned). One way to accomplish this is to scale both layers together (make both thicker) to increase the total volume of the bias layer without changing the bias itself.

The paired layers 66,70, i.e dM=0 layers 80, are preferably "self-pinned", meaning that no AFM layer is used to pin either of the layers. The pinning is instead accomplished from interfacial magnetic anisotropy, meaning that due to internal stress in the material, domains in the material tends to self-align in certain directions, referred to as "easy axes". In self-pinned material, this magnetostrictive anisotropy is strong enough to effectively pin the material, thus the material is "self-pinned". This is desirable again, because layers of AFM material used to pin other layers are generally relatively thick and contribute greatly to the overall dimensions of the read head.

Although the primary pinned layers 76 are shown in FIG. 5 as being pinned by an antiferromagnetic (AFM) layer 72 under the seed layer 52, it is also possible, as an alternative embodiment, that the first and second pinned layers 54, 58, i.e. the primary pinned layers 76, are self-pinned, as discussed above in relation to the paired layers 66, 70

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head comprising:
   a read sensor which is of Current Perpendicular to the Plane (CPP) configuration including:
   at least one primary pinned layer;
   a barrier layer;
   a free layer;
   an in-stack biasing structure having net magnetic moment which is substantially equal to zero, which acts to stabilize said free layer by exchange coupling.

2. The magnetic head of claim 1, wherein:
   said in-stack biasing structure includes paired layers of opposite magnetic orientation which are separated by a spacer layer, such that the net magnetic moment of said paired layers is substantially zero.

3. The magnetic head of claim 2, wherein:
   said net magnetic moment substantially equal to zero corresponds to a difference in thickness of said paired layers of opposite magnetic orientation which is less than $5 \times 10^{-10}$ meters.

4. The magnetic head of claim 1, wherein:
   said in-stack biasing structure includes a self-pinned layer pair.

5. The magnetic head of claim 1, wherein:
   said at least one primary pinned layer includes a pair of primary pinned layers, separated by a spacer layer.

6. The magnetic head of claim 5, further comprising:
   at least one layer of AFM material which acts to pin said pair of primary pinned layers.

7. The magnetic head of claim 5, wherein:
   said pair of primary pinned layers are self-pinned layers.

8. A disk drive comprising:
   at least one hard disk;
   at least, one magnetic head adapted to fly over said hard disk for writing data on said hard disk, and having an air bearing surface, said magnetic head including:
   a read sensor which is of Current Perpendicular to the Plane (CPP) configuration including:
   at least one primary pinned layer;
   a baffler layer;
   a free layer;
   an in-stack biasing structure having net magnetic moment which is substantially equal to zero, which acts to stabilize said free layer by exchange coupling.

9. The disk drive of claim 8, wherein:
   said in-stack biasing structure includes paired layers of opposite magnetic orientation which are separated by a spacer layer, such that the net magnetic moment of said paired layers is substantially zero.

10. The disk drive of claim 9, wherein:
said net magnetic moment substantially equal to zero corresponds to a difference in thickness of said paired layers of opposite magnetic orientation which is less than $5 \times 10^{-10}$ meters.

11. The disk drive of claim 8, wherein:
said in-stack biasing structure includes a self-pinned layer pair.

12. The disk drive of claim 8, wherein:
said at least one primary pinned layer includes a pair of primary pinned layers, separated by a spacer layer.

13. The disk drive of claim 12, further comprising:
at least one layer of AFM material which acts to pin said pair of primary pinned layers.

14. The disk drive of claim 12, wherein:
said pair of primary pinned layers are self-pinned layers.

* * * * *